(12) United States Patent
Kim

(10) Patent No.: US 6,260,608 B1
(45) Date of Patent: Jul. 17, 2001

(54) WINDSHIELD CLEARING AND DE-ICING SYSTEM

(76) Inventor: Donald Ray Kim, 18573 E. Colima Rd., #B, Rowland Heights, CA (US) 91748

( * ) Notice: Subject to any disclaimer, the term of this patent is extended or adjusted under 35 U.S.C. 154(b) by 0 days.

(21) Appl. No.: 09/484,462

(22) Filed: Jan. 14, 2000

(51) Int. Cl.[7] .................................................. B05B 1/24
(52) U.S. Cl. ..................... 165/41; 219/203; 237/12.3 R; 239/130; 239/131; 392/488; 392/495
(58) Field of Search ................... 165/41, 51, 57; 239/129, 130, 131; 237/12.3 R, 12.3 A; 219/203; 392/479, 441, 449, 465, 478, 485, 486, 487, 488, 489, 490, 495

(56) References Cited

U.S. PATENT DOCUMENTS

| | | | |
|---|---|---|---|
| 2,260,904 | * | 10/1941 | Horton . |
| 3,292,866 | * | 12/1966 | Benner . |
| 3,319,891 | * | 5/1967 | Campbell . |
| 3,366,336 | * | 1/1968 | Neuschwanger et al. . |
| 3,632,042 | | 1/1972 | Goulish . |
| 3,756,510 | * | 9/1973 | Nitterl et al. ........................ 239/129 |
| 4,090,668 | | 5/1978 | Kochenour . |
| 4,354,548 | | 10/1982 | Carlsson . |
| 4,700,424 | * | 10/1987 | Hagen .............................. 239/130 X |
| 4,832,262 | * | 5/1989 | Robertson ............................ 239/129 |
| 4,940,082 | * | 7/1990 | Roden .............................. 239/130 X |
| 5,099,909 | * | 3/1992 | Barigelli ................................ 165/41 |
| 5,327,614 | | 7/1994 | Egner-Walter et al. . |
| 5,383,247 | * | 1/1995 | Nickel ............................... 239/130 X |
| 5,459,811 | * | 10/1995 | Glovan et al. .................... 392/488 X |
| 5,509,606 | * | 4/1996 | Breithaupt et al. ................... 239/130 |
| 5,522,453 | * | 6/1996 | Green ................................... 165/41 |
| 5,699,581 | * | 12/1997 | Heneghan et al. ............... 219/203 X |
| 5,784,751 | | 7/1998 | Tippets . |
| 5,810,247 | | 9/1998 | Petroff . |
| 5,881,428 | * | 3/1999 | Simmons .......................... 239/130 X |
| 5,927,608 | * | 7/1999 | Scorsiroli ......................... 239/130 X |
| 5,979,796 | * | 11/1999 | Ponziani et al. .................. 219/203 X |
| 6,008,474 | * | 12/1999 | Dumas ................................. 219/203 |
| 6,028,291 | * | 2/2000 | Heisler ................................ 219/203 |
| 6,029,908 | * | 2/2000 | Petzold ............................ 239/130 X |
| 6,094,524 | * | 7/2000 | Riley ................................... 392/485 |
| 6,133,546 | * | 10/2000 | Bains ............................... 219/203 X |

* cited by examiner

Primary Examiner—Ira S. Lazarus
Assistant Examiner—Ljiljana V. Ciric

(57) ABSTRACT

A windshield clearing and de-icing system including a first housing having air inlet and outlet ports extending through walls of the first housing and further having fluid inlet and outlet ports extending through the walls of the first housing, and also including a first air conduit member connected to the air inlet and outlet ports and a first fluid conduit member connected to the fluid inlet and outlet ports. The system and also includes a heating member connected to a fan having a motor and securely mounted in a second housing which is adapted to be mounted in an engine compartment of a vehicle. The system and further includes a heater member being adapted to be connected to a fluid reservoir pump and connected to a second fluid conduit member which is connected to the first fluid conduit member.

6 Claims, 2 Drawing Sheets

WINDSHIELD CLEARING AND DE-ICING SYSTEM

BACKGROUND OF THE INVENTION

1. Field of the Invention

The present invention relates to a means for clearing a windshield of a vehicle and more particularly pertains to a new windshield clearing and de-icing system for easily and quickly clearing windshields from a buildup of ice or snow.

2. Description of the Prior Art

The use of means for clearing a windshield of a vehicle is known in the prior art. More specifically, means for clearing a windshield of a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,632,042; U.S. Pat. No. 4,090,668; U.S. Pat. No. 5,810,247; U.S. Pat. No. 5,327,614; U.S. Pat. No. 5,784,751; and U.S. Pat. No. 4,354,548.

While these devices fulfill their respective, particular objectives and requirements, the aforementioned patents do not disclose a new windshield clearing and de-icing system. The inventive device includes two dispensing members each of which includes a first housing having air inlet and outlet ports extending through walls of the first housing and further having fluid inlet and outlet ports extending through the walls of the first housing, and also includes a first air conduit member connected to the air inlet and outlet ports and a first fluid conduit member connected to the fluid inlet and outlet ports; and also includes a heating member connected to a fan having a motor and securely mounted in a second housing which is adapted to be mounted in an engine compartment of a vehicle; and further includes a heater member adapted to be connected to a fluid reservoir pump and connected to a second fluid conduit member which is connected to the first fluid conduit member.

In these respects, the windshield clearing and de-icing system according to the present invention substantially departs from the conventional concepts and designs of the prior art, and in so doing provides an apparatus primarily developed for the purpose of easily and quickly clearing windshields from a buildup of ice or snow.

SUMMARY OF THE INVENTION

In view of the foregoing disadvantages inherent in the known types of means for clearing a windshield of a vehicle now present in the prior art, the present invention provides a new windshield clearing and de-icing system construction wherein the same can be utilized for easily and quickly clearing windshields from a buildup of ice or snow.

The general purpose of the present invention, which will be described subsequently in greater detail, is to provide a new windshield clearing and de-icing system which has many of the advantages of the means for clearing a windshield of a vehicle mentioned heretofore and many novel features that result in a new windshield clearing and de-icing system which is not anticipated, rendered obvious, suggested, or even implied by any of the prior art means for clearing a windshield of a vehicle, either alone or in any combination thereof.

To attain this, the present invention generally comprises a first housing having air inlet and outlet ports extending through walls of the first housing and further having fluid inlet and outlet ports extending through the walls of the first housing, and also includes a first air conduit member connected to the air inlet and outlet ports and a first fluid conduit member connected to the fluid inlet and outlet ports; and also includes a heating member connected to a fan having a motor and securely mounted in a second housing which is adapted to be mounted in an engine compartment of a vehicle; and further includes a heater member adapted to be connected to a fluid reservoir pump and connected to a second fluid conduit member which is connected to the first fluid conduit member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new windshield clearing and de-icing system which has many of the advantages of the means for clearing a windshield of a vehicle mentioned heretofore and many novel features that result in a new windshield clearing and de-icing system which is not anticipated, rendered obvious, suggested, or even implied by any of the prior art means for clearing a windshield of a vehicle, either alone or in any combination thereof.

It is another object of the present invention to provide a new windshield clearing and de-icing system which may be easily and efficiently manufactured and marketed.

It is a further object of the present invention to provide a new windshield clearing and de-icing system which is of a durable and reliable construction.

An even further object of the present invention is to provide a new windshield clearing and de-icing system which is susceptible of a low cost of manufacture with regard to both materials and labor, and which accordingly is then susceptible of low prices of sale to the consuming public, thereby making such windshield clearing and de-icing system economically available to the buying public.

Still yet another object of the present invention is to provide a new windshield clearing and de-icing system which provides in the apparatuses and methods of the prior art some of the advantages thereof, while simultaneously overcoming some of the disadvantages normally associated therewith.

Still another object of the present invention is to provide a new windshield clearing and de-icing system for easily and quickly clearing windshields from a buildup of ice or snow.

Yet another object of the present invention is to provide a new windshield clearing and de-icing system which includes a first housing having air inlet and outlet ports extending through walls of the first housing and further having fluid inlet and outlet ports extending through the walls of the first housing, and also includes a first air conduit member connected to the air inlet and outlet ports and a first fluid conduit member connected to the fluid inlet and outlet ports; and also includes a heating member connected to a fan having a motor and securely mounted in a second housing which is adapted to be mounted in an engine compartment of a vehicle; and further includes a heater member adapted to be connected to a fluid reservoir pump and connected to a second fluid conduit member which is connected to the first fluid conduit member.

Still yet another object of the present invention is to provide a new windshield clearing and de-icing system that improves safe driving conditions.

Even still another object of the present invention is to provide a new windshield clearing and de-icing system that allows the user to always keep one's windshield obstruction free regardless of the environmental conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
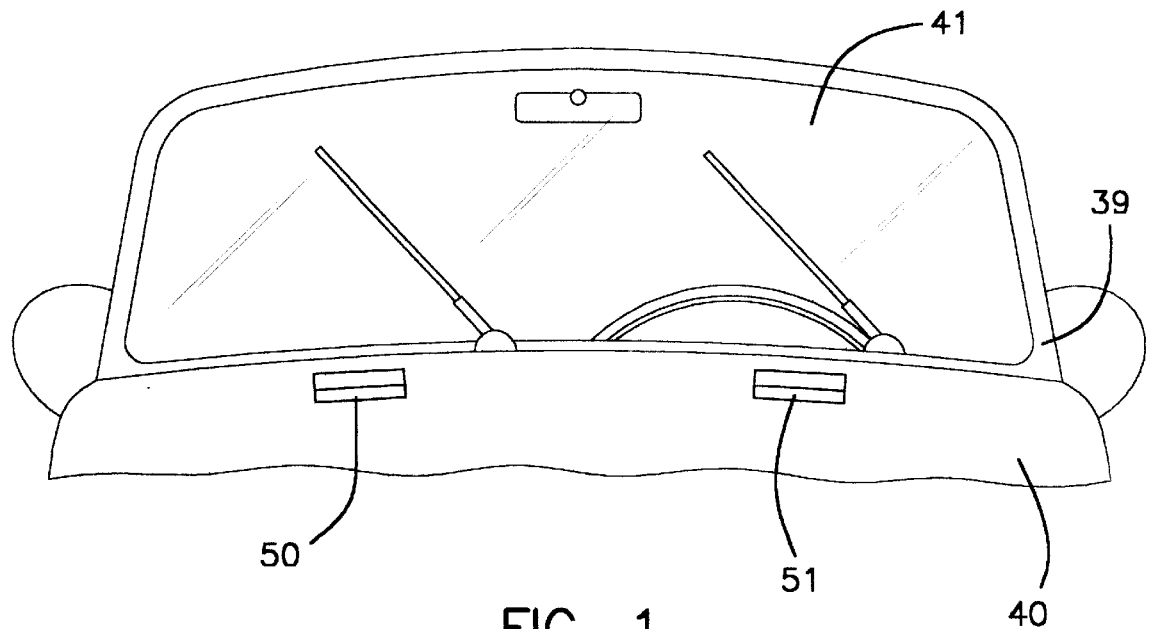
FIG. 1 is a front elevational view of dispensing members of a new windshield clearing and de-icing system according to the present invention and being mounted to a hood of a vehicle.
Figure 2:
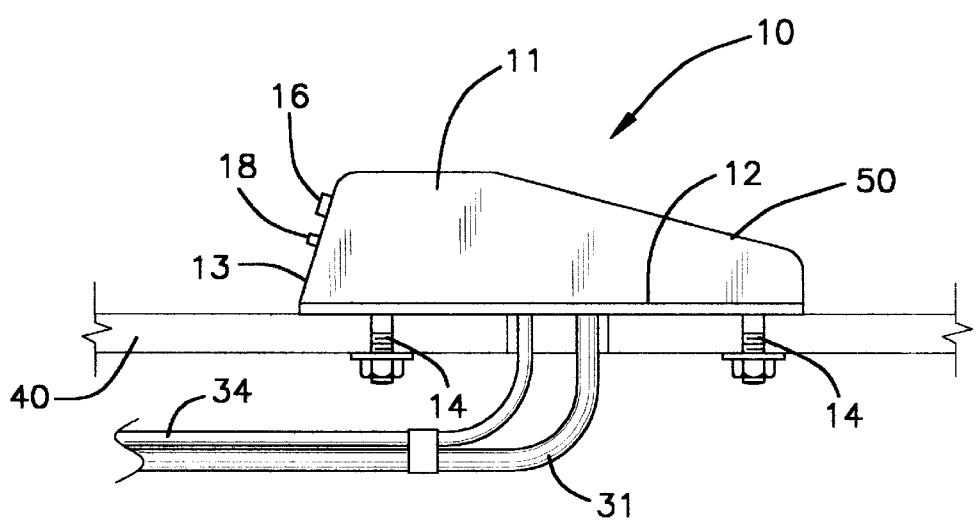
FIG. 2 is a side elevational view of one of the dispensing members of the present invention.
Figure 3:
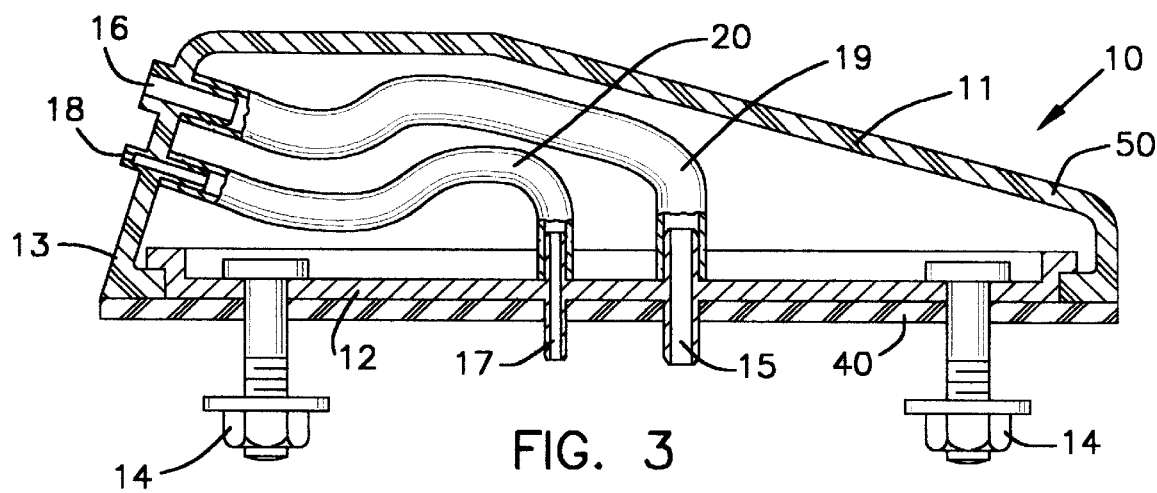
FIG. 3 is a side cross-sectional view of one of the dispensing members of the present invention.
Figure 4:
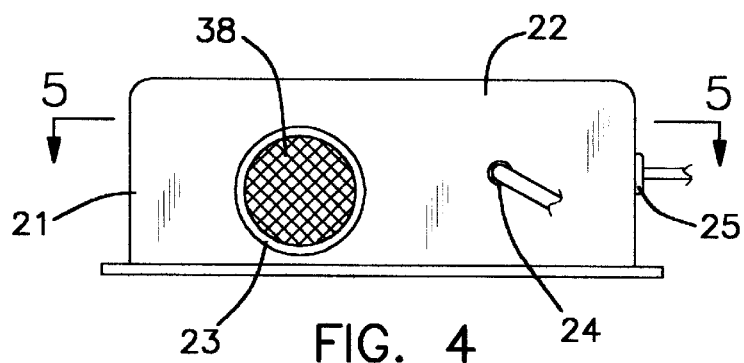
FIG. 4 is a side elevational view of the second housing of the present invention.
Figure 5:
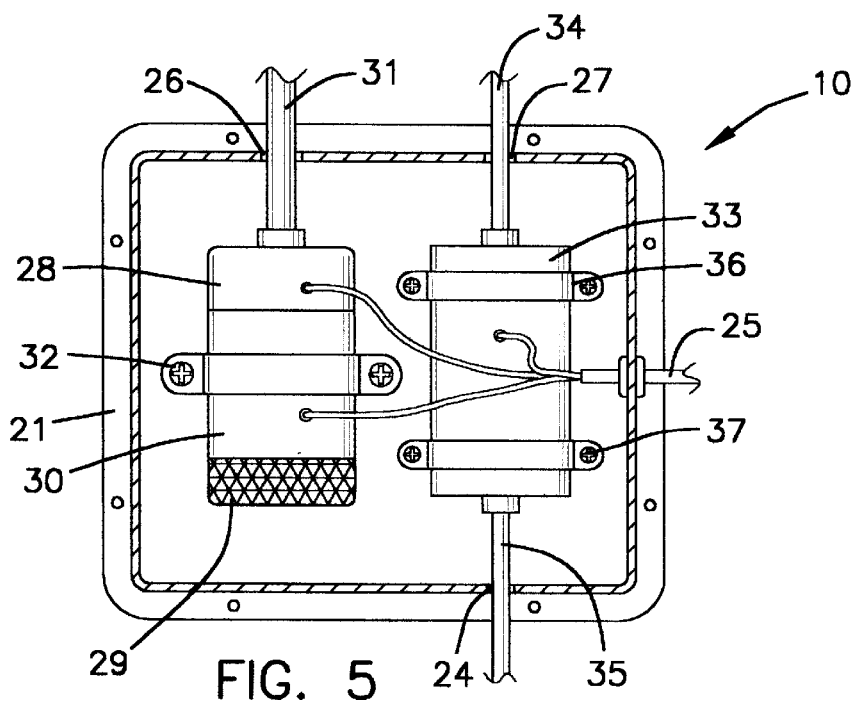
FIG. 5 is a cross sectional view of the second housing of the present invention showing in particular the heater and heating members and the fan including the motor.

With reference now to the drawings, and in particular to FIGS. 1 through 5 thereof, a new windshield clearing and de-icing system embodying the principles and concepts of the present invention and generally designated by the reference numeral 10 will be described.

As best illustrated in FIGS. 1 through 5, the windshield clearing and de-icing system 10 generally comprises two dispensing members 50, 51 being adapted to be securely mounted at a base of a windshield 41 of a vehicle 39. Each of the dispensing members 50, 51 includes a first housing 11 having a bottom wall 12 and a wall 13 facing the windshield 41. The first housing 11 further has a fluid inlet port 17 and an air inlet port 15 extending through the bottom wall 12 and also has a fluid outlet port 18 and an air outlet port 16 extending through the wall 13 facing the windshield 41. Each of the dispensing members 50, 51 further includes a first air conduit member 19 securely and conventionally connected to the air inlet port 15 and to the air outlet port 16 and also includes a first fluid conduit member 20 securely and conventionally connected to the fluid inlet port 17 and to the fluid outlet port 18. The first housing 11 is adapted to be securely mounted with fasteners 14 to a hood 40 of a vehicle 39. A second housing 21 is adapted to be securely mounted in an engine compartment of a vehicle 39. The second housing 21 includes side walls 22, a bottom wall, a plurality of openings 23–27 extending through the side walls 22, and a screen 38 securely and conventionally mounted over one of the openings 23 for allowing air to be drawn into the second housing 21. A means for generating and transporting hot air to the dispensing members 50, 51 includes a heating member 28 comprising heating coils and securely fastened inside the second housing 21 with fastening or clamping members 32 and adapted to be connected to a power source, and further includes a fan 29 having a motor 30 and conventionally connected to the heating member 28 and securely fastened inside the second housing 21 with fastening or clamping members 32 and adapted to be connected to a power source, and also includes a second air conduit member 31 extending through one of the openings 26 in the second housing 21 and conventionally connected to the heating member 28 and to the fan 29 and also conventionally connected to the air inlet port 15. A means for heating and transporting fluid to the dispensing members 50, 51 includes a heater member 33 securely fastened inside the second housing 21 with fastening or clamping members 36, 37 and adapted to be connected to a power source, and also includes a second fluid conduit member 35 securely and conventionally connected to the heater member 33 and adapted to be connected to a fluid reservoir pump for a windshield washer unit in the vehicle 39, and further includes a third fluid conduit member 34 securely and conventionally connected to the heater member 33 and extending through one of the openings 27 in the second housing 21 and conventionally connected to the fluid inlet port 17.

In use, the user can switch on the power source inside the vehicle 39 which energizes the fan 29 and the heating member 28 which creates a flow of hot air through the second air conduit member 31 and through the first air conduit member 19 and out of the air outlet port 16 and onto the windshield 41. The user can also conventionally send windshield washer fluid through the heater member 33 which is also energized by the power source and through the third fluid conduit member 34 and through the first fluid conduit member 20 and out of the fluid outlet port 18 and onto the windshield 41 for the clearing thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A windshield clearing and de-icing system comprising:

at least one dispensing member adapted to be securely mounted at a base of a windshield of a vehicle and including a first housing having a bottom wall and a wall facing the windshield, said first housing further having a fluid inlet port and an air inlet port extending through said bottom wall and also having a fluid outlet port and an air outlet port extending through said wall facing the windshield, said at least one dispensing member further including a first air conduit member connected to said air inlet port and said air outlet port to and also including a first fluid conduit member connected to said fluid inlet to port and said fluid outlet port;

a second housing adapted to be securely mounted in an engine compartment of a vehicle;

a means for generating and transporting hot air to said at least one dispensing member; and a means for heating and transporting fluid to said at least one dispensing member.

2. A windshield clearing and de-icing system as described in claim 1, wherein said first housing is adapted to be securely mounted with fasteners to a hood of a vehicle.

3. A windshield clearing and de-icing system as described in claim 2, wherein said second housing includes side walls, a bottom wall, a plurality of openings extending through said side walls, and a screen securely mounted over one of said openings for allowing air to be drawn into said second housing.

4. A windshield clearing and de-icing system as described in claim 3, wherein said means for generating and transporting hot air to said at least one dispensing member includes a heating member securely fastened inside said second housing and adapted to be connected to a power source, a fan including a motor connected to said heating member and securely fastened inside said second housing and adapted to be connected to a power source, and a second air conduit member extending through one of said openings in said second housing and connected to said heating member and to said fan and also connected to said air inlet port.

5. A windshield clearing and de-icing system as described in claim 4, wherein said means for heating and transporting fluid to said a least one dispensing member includes a heater member securely fastened inside said second housing and adapted to be connected to a power source, a second fluid conduit member securely connected to said heater member and adapted to be connected to a fluid reservoir pump in the vehicle, and a third fluid conduit member securely connected to said heater member and extending through one of said openings in said second housing and connected to said fluid inlet port.

6. A windshield clearing and de-icing system comprising:

at least one dispensing member adapted to be securely mounted at a base of a windshield of a vehicle and including a first housing having a bottom wall and a wall facing the windshield, said first housing further having a fluid inlet port and an air inlet port extending through said bottom wall and also having a fluid outlet port and an air outlet port extending through said wall facing the windshield, said at least one dispensing member further including a first air conduit member being connected to said air inlet port and said air outlet port to and also including a first fluid conduit member connected to said fluid inlet port and to said fluid outlet port, said first housing adapted to be securely mounted with fasteners to a hood of a vehicle;

a second housing adapted to be securely mounted in an engine compartment of a vehicle, said second housing including side walls, a bottom wall, a plurality of openings extending through said side walls, and a screen securely mounted over one of said openings for allowing air to be drawn into said second housing;

a means for generating and transporting hot air to said at least one dispensing member including a heating member securely fastened inside said second housing and adapted to be connected to a power source, a fan including a motor connected to said heating member and securely fastened inside said second housing and adapted to be connected to a power source, and a second air conduit member extending through one of said openings in said second housing and connected to said heating member and to said fan and also connected to said air inlet port; and a means for heating and transporting fluid to said at least one dispensing member including a heater member securely fastened inside said second housing and adapted to be connected to a power source, a second fluid conduit member securely connected to said heater member and adapted to be connected to a fluid reservoir pump for a windshield washer unit in the vehicle, and a third fluid conduit member securely connected to said heater member and extending through one of said openings in said second housing and connected to said fluid inlet port.

* * * * *